(12) United States Patent
Hoppe

(10) Patent No.: US 7,033,073 B2
(45) Date of Patent: Apr. 25, 2006

(54) DEVICE AND METHOD FOR MEASURING THE TEMPERATURE OF AN ELECTRIC MOTOR

(75) Inventor: Thomas Hoppe, Schwabhausen/Stetten (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/793,143

(22) Filed: Mar. 4, 2004

(65) Prior Publication Data

US 2004/0190207 A1 Sep. 30, 2004

Related U.S. Application Data

(63) Continuation of application No. PCT/EP02/09900, filed on Sep. 4, 2002.

(30) Foreign Application Priority Data

Sep. 4, 2001 (DE) ................ 101 43 222

(51) Int. Cl.
*G01K 5/00* (2006.01)
(52) U.S. Cl. .............. 374/187; 374/152; 361/25
(58) Field of Classification Search ............ 374/152, 374/187, 188, 189, 210, 161, 162; 385/12, 385/15; 361/25; 318/471; 388/934; 310/68 C
See application file for complete search history.

(56) References Cited

U.S. PATENT DOCUMENTS

| | | | | |
|---|---|---|---|---|
| 2,717,945 A | * | 9/1955 | Briggs et al. ........... | 374/144 |
| 3,219,856 A | * | 11/1965 | Dunwiddie et al. ....... | 310/68 R |
| 3,516,082 A | | 6/1970 | Cooper | |
| 3,537,053 A | * | 10/1970 | Russell et al. ............ | 374/152 |
| 3,852,570 A | * | 12/1974 | Tyler ...................... | 374/164 |
| 3,927,570 A | * | 12/1975 | Hedvall et al. ........... | 374/152 |
| 4,362,057 A | * | 12/1982 | Gottlieb et al. ........... | 374/152 |
| 4,714,342 A | * | 12/1987 | Jackson et al. ............ | 356/44 |
| 4,773,350 A | * | 9/1988 | Lyons ..................... | 374/152 |
| 4,827,487 A | * | 5/1989 | Twerdochlib ............ | 374/152 |
| 4,863,280 A | * | 9/1989 | Doemens ................. | 374/152 |
| 5,232,285 A | * | 8/1993 | Mannik .................. | 374/152 |
| 5,295,206 A | * | 3/1994 | Mischenko .............. | 385/12 |
| 5,473,428 A | * | 12/1995 | Lee et al. ................. | 356/480 |

(Continued)

FOREIGN PATENT DOCUMENTS

DE     OS 1 615 615     6/1970

(Continued)

OTHER PUBLICATIONS

English language JPO Abstract of JP 08080011 A, Niikura, Hitoshi, (Mar. 1996).*

(Continued)

*Primary Examiner*—Diego Gutierrez
*Assistant Examiner*—Stanley J. Pruchnic, Jr.
(74) *Attorney, Agent, or Firm*—Henry M. Feiereisen

(57) ABSTRACT

In order to determine the temperature in the winding region of an electric motor, especially linear motor, a measuring line made of uniform; electrically conductive material is integrated in a winding, preferably in sections between winding teeth. The measuring line may be configured as insulated double line which is short-circuited on one side. A change in the resistance value of the measuring line allows conclusion about a temperature change and is easy to ascertain.

8 Claims, 1 Drawing Sheet

U.S. PATENT DOCUMENTS

| | | | |
|---|---|---|---|
| 6,024,488 A | * | 2/2000 | Wu et al. .................... 374/161 |
| 6,028,382 A | | 2/2000 | Blalock et al. |
| 6,056,436 A | * | 5/2000 | Sirkis et al. ................ 374/161 |
| 6,527,440 B1 | * | 3/2003 | Jenkins ....................... 374/152 |
| 6,659,640 B1 | * | 12/2003 | Ruffa ......................... 374/161 |
| 6,888,124 B1 | * | 5/2005 | Smith .................... 250/227.14 |
| 2002/0196994 A1 | * | 12/2002 | Bosselmann et al. ......... 385/12 |
| 2003/0156777 A1 | * | 8/2003 | Bosselmann et al. ......... 385/12 |

FOREIGN PATENT DOCUMENTS

| | | |
|---|---|---|
| DE | 24 27 830 A1 | 1/1975 |
| DE | 37 06 659 C2 | 9/1988 |
| DE | 93 12 381 U1 | 11/1993 |
| DE | 199 25 699 C | 11/2000 |
| DE | 199 35 440 A | 2/2001 |
| EP | 0 367 066 A2 | 5/1990 |
| EP | 0 414 052 A2 | 2/1991 |
| JP | 2000299967 A * | 10/2000 |

OTHER PUBLICATIONS

M. Lequime: "Fiber Sensors For Industrial Applications", 12th International Conference on Optical Fiber Sensors Technical Digest, Williamsburg, VA, Oct. 28-31, 1997, pp. 66-71.*

H. Fevrier et al.: "A Temperature Optical Fiber Sensor Network: From Laboratory Feasibility To Field Trial", Conference Proceedings, 8th Optical Fiber Sensors Conference, Monterey, CA, Jan. 29-31, 1992, pp. 262-265.*

Elektro-Jahr 1979, Messen und Überwachen von Temperaturen an grossen Asynchronmotoren, pp. 27-30.

Japanese Abstract JP 53 049485 A, May 4, 1987, (English Translation).

Japanese Abstract JP 05 137298 A, Jun. 1, 1993 (English Translation).

* cited by examiner

DEVICE AND METHOD FOR MEASURING THE TEMPERATURE OF AN ELECTRIC MOTOR

CROSS-REFERENCES TO RELATED APPLICATIONS

This application is a continuation of prior filed copending PCT International application No. PCT/EP02/09900, filed Sep. 4, 2002, which designated the United States and on which priority is claimed under 35 U.S.C. §120, the disclosure of which is hereby incorporated by reference.

This application claims the priority of German Patent Application, Serial No. 101 43 222.4, filed Sep. 4, 2001, pursuant to 35 U.S.C. 119(a)–(d), the disclosure of which is incorporated herein by reference.

BACKGROUND OF THE INVENTION

The present invention relates, in general, to a device for measuring the temperature of a winding-carrying structural part of an electric motor, and to a method of determining the temperature in a winding area of an electric motor.

An electric motor of a type involved here generally includes a primary part and a secondary part which are disposed in opposite spaced-apart relationship to define an elongated air gap therebetween. The primary part is typically made of an iron body in the form of laminated electric sheets, and has slots for receiving current-carrying windings. Operation of the electric motor generates heat, in particular in the primary apart, which must be carried away to the outside to prevent in the primary part an unacceptable temperature rise that may damage the winding insulation or permanently destroy the primary part. An attempt to address this problem involves the provision of a thermocouple as thermal sensor in the area of the windings for monitoring the temperature in electric motors, in particular high-power motors. This approach suffers shortcomings because the thermocouple operates relatively sluggish as a consequence of the solid insulation and because the positioning of thermocouples with spot measurement cannot be adequately reproduced and results in measuring errors of ±10° C.

It would therefore be desirable and advantageous to provide an improved temperature measuring device which obviates prior art shortcomings and which is simple in structure while still being reliable in operation and yielding precise results.

It would also be desirable and advantageous to provide an improved method of determining the temperature in a winding area of an electric motor.

SUMMARY OF THE INVENTION

According to one aspect of the present invention, a device for measuring the temperature of a winding-carrying structure of an electric motor includes an elongate measuring element made of material having a temperature-dependent material characteristic and having a line portion which extends along at least one winding, and a detector for determining a change in the material characteristic of the measuring element.

According to another feature of the present invention, the measuring element may be implemented as a rod whose temperature-dependent change in length can be ascertained by mounting suitable position transducers on one or both ends of the rod. Of course, the detector may also be implemented in an optical manner. In other words, the detector may be constructed to determine an optical material characteristic of the material.

It is also possible to analyze optical properties of glass or plastics which are temperature-dependent, in which case the measuring element may be realized as rod or as glass fiber or plastic fiber for use as optical guide for example. Suitably, the measuring element is made of uniform material in the area of the line portion.

Since the measuring element extends via the line portion along at least one winding, the material of the measuring element is heated in this line portion so that the temperature-dependent material property changes and the temperature can be ascertained on the basis of this change.

According to another feature of the present invention, the measuring element may be constructed as an additional measuring line which is made of uniformly electrically conductive material and has ends which are routed to the outside of the electric motor. This feature exploits the fact that electric properties, in particular the temperature dependency of the resistance, of a known material is normally known or can be measured in a simple manner. As a line portion of the measuring line extends across at least one winding, the material of the measuring line heats up, thereby changing the resistance so that the temperature can be ascertained on the basis of this change in resistance.

According to another feature of the present invention, the measuring element or the measuring line may be placed upon a winding, or may be embedded in a winding so that the temperature inside the winding can be determined. Suitably, the measuring line to provide the measuring element may be implemented as an insulated single wire.

Highest temperatures are normally encountered in the areas of the windings within the winding body or core. Thus, the line portion of the measuring element is suitably positioned also in this area, in particular in a way that the line portion covers the entire region of the winding, situated within the winding core. The line portion may hereby be subdivided in several sections.

According to another feature of the present invention, the measuring element may be configured as insulated double line with one short-circuited end so that the line portion of the measuring line can have an prolonged configuration for measurement of a change in resistance. It is also conceivable to configure the measuring line as coil in the area of the winding.

According to another feature of the present invention, the measuring element may have a diameter which substantially corresponds to a diameter of a winding wire that forms the winding. In this way, the measuring element is easy to integrate in the winding structure.

According to another aspect of the present invention, an electric motor can be constructed as linear motor or rotary motor to include a temperature measuring device according to the present invention.

According to still another aspect of the present invention, a method of determining the temperature in an area of a winding of an electric motor, includes the steps of monitoring an electric property of at least one coil during operation of the electric motor, ascertaining an instantaneous coil resistance, and determining a temperature in an area of the winding on the basis of the coil resistance. Thus, the novel and inventive method also exploits the change in resistance for temperature measurement by monitoring the d.c. resistance value of at least one coil or winding during operation and using the resistance value for determining the temperature.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
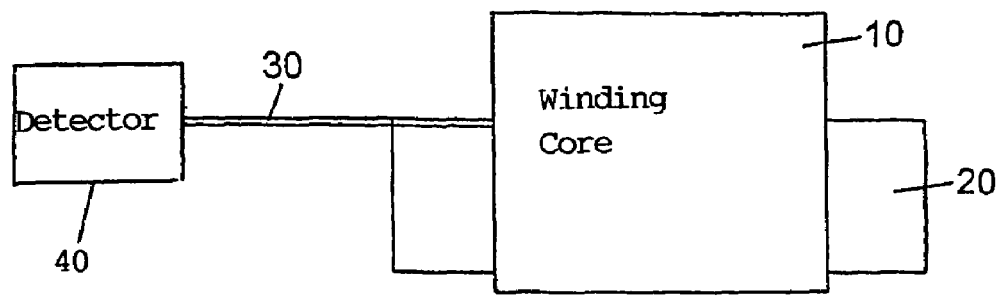
FIG. 1 is a schematic side view of a primary part of a linear motor, having incorporated therein the subject matter according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic side view of a primary part of a typical linear motor. The primary part has a winding core 10 which may be conventionally comprised of a plurality of laminations (not shown) having slots to form winding teeth 12 (FIG. 2) about which are wound windings 20. Structure and operation of such primary part of a linear motor involved here are generally known so that a detailed description thereof is omitted for the sake of simplicity.

In accordance with the present invention, the primary part includes at least one additional measuring line 30 having a line portion which is embedded in at least one winding 20. As shown by way of example in FIG. 2, the measuring line 30 includes two line sections 32, 36 which form an insulated double line with an insulated short-circuited end 34 for embedment in the coils so as to cover essentially the entire area of the coils or windings 20 between the winding teeth 12. The terms "coil" or "winding" are used here interchangeably and are meant to refer to a turn of wire. The line sections 32, 36 are interconnected by a bridge 38. The terminals of the measuring line 30 are routed to the outside for connection to a detector 40 (FIG. 1) which has incorporated therein required electric circuits for measuring the resistance.

Figure 2:
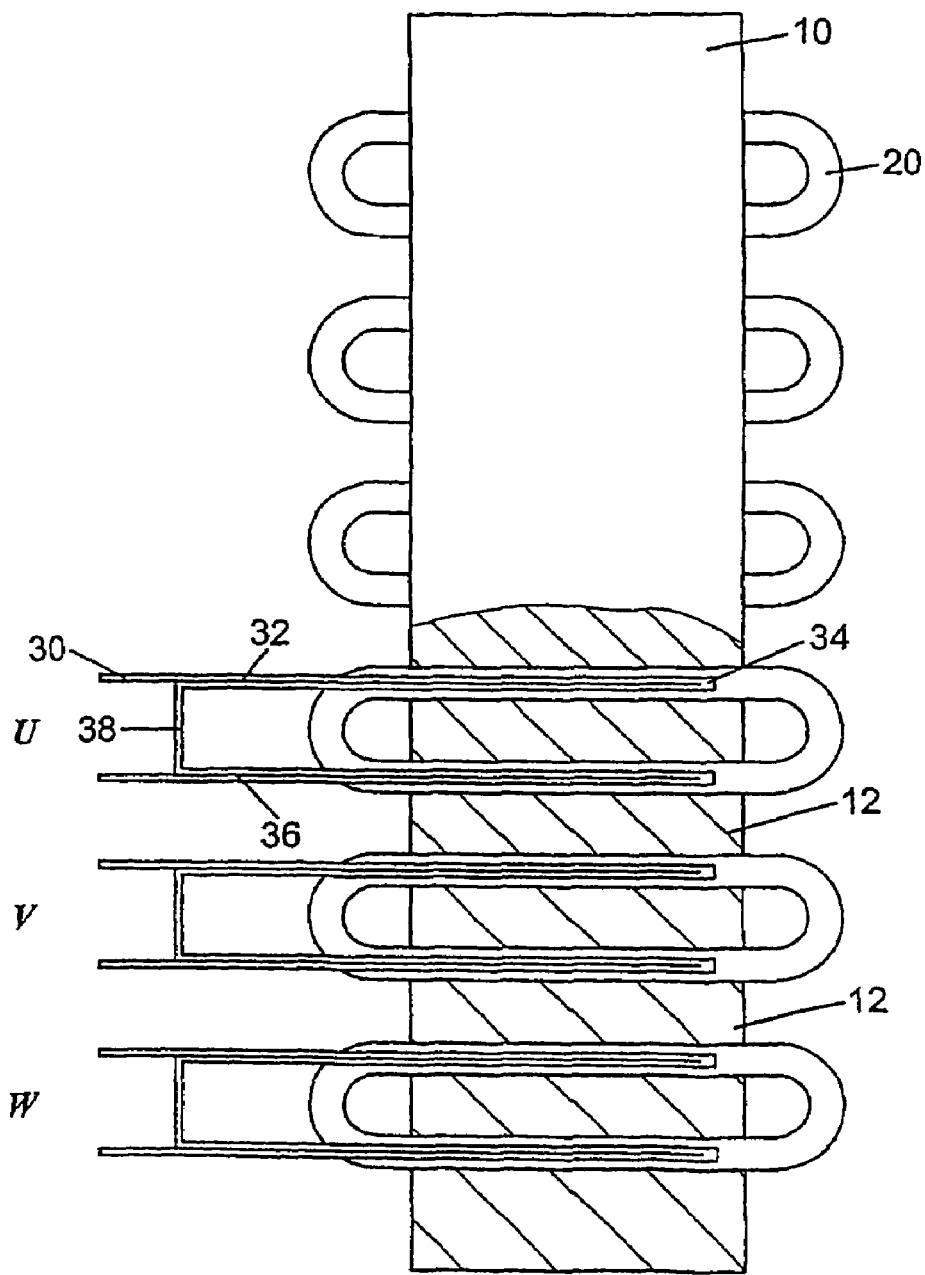
FIG. 2 is a top view, partly broken away, of the primary part of FIG. 1.

FIG. 2 shows the arrangement of three measuring lines 30 for cooperation with three windings 20 in one-to-one correspondence. The three measuring lines 30 may be used separately for temperature measurement in the individual windings 20 so that each phase U, V, W can be individually controlled during operation with three-phase alternating current.

During operation of the linear motor, the electric resistance of the measuring line 30 can be measured by any suitable process known to the artisan and compared with resistance values which can be calculated on the basis of the dimensions of the measuring line 30 and the temperature-dependent material property, and/or through calibration of the measuring line. On the basis of this comparison, the temperature in the area of the winding 20 can be determined.

The measuring line(s) 30 can be made of any electrically conductive material with a suitable temperature dependency. At least in the area of the line portion that interacts with the winding 20, the measuring line 30 is made of uniform material, i.e. made of a single material, such as glass or plastic. In this way, stress is avoided in contact areas and the determination of the resistance value is simplified.

Of course, it is also conceivable to use the coils or windings 20 as such for determination of the temperature. Also in this case, the material properties are temperature-dependent so that a measurement of electric variables can be used as basis for determination of the resistance or changes in resistance. Such a measurement may be carried out for example in a single coil or in all coils of a phase through appropriate calibration of the primary part. Calibration may be realized for example by tabulating resistance values in dependence on a set temperature to provide a table for correlating the resistance values to the temperature values.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. In combination, a linear motor and a device for measuring the temperature of a winding-carrying structure of said linear motor, comprising:
    an elongate measuring element made of a material, which has a temperature-dependent material characteristic, and including a line portion which extends along at least one winding, wherein the material of the measuring element is uniform at least in the area of the line portion, wherein the measuring element is a rod and the material characteristic is an expansion in length of the rod, and wherein the measuring element has a diameter which substantially corresponds to a diameter of a winding carried by said structure wire; and
    a detector for determining a change in the material characteristic of the measuring element.

2. The combination of claim 1, wherein the detector includes a position transducer provided on one or both ends of the rod.

3. The combination of claim 1, wherein the material of the measuring element is glass or plastic.

4. The combination of claim 1, wherein the measuring element is placed upon the winding.

5. The combination of claim 1, wherein the measuring element is embedded in the winding.

6. The combination of claim 1, wherein the line portion of the measuring element is positioned in an area of a winding core.

7. The combination of claim 6, wherein the line portion of the measuring element has plural sections for substantially covering an entire region of the winding inside the winding core.

8. A linear motor comprising a primary part having a winding core which includes a coil of winding wire; and a temperature measuring device having an elongate measuring element made of a material which has a temperature-dependent material characteristic and including a line portion which extends along at least one winding, wherein the material of the measuring element is uniform at least in the area of the line portion, wherein the measuring element is a rod and the material characteristic is an expansion in length of the rod, and wherein the measuring element has a diameter which substantially corresponds to a diameter of the winding wire, and a detector for determining a change in the material characteristic of the measuring element.

* * * * *